Dec. 15, 1953 — W. W. ROCKLEN — 2,662,398
FUEL-SYSTEM TESTING DEVICE
Filed Jan. 9, 1951
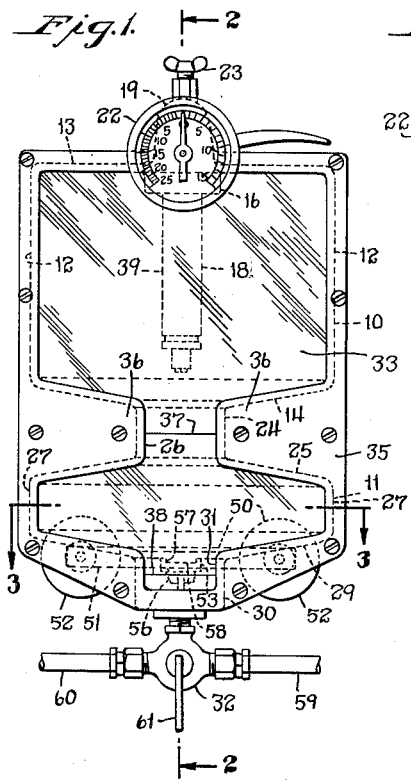
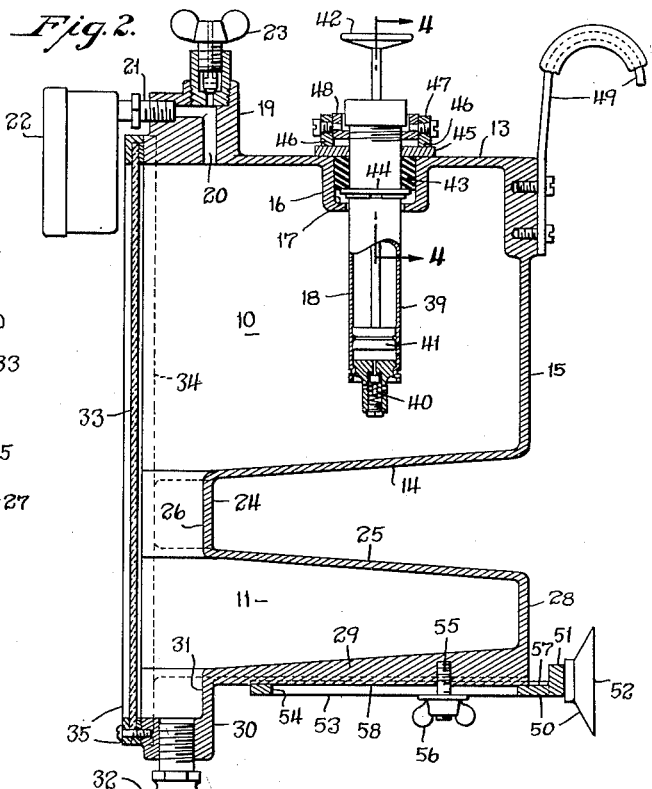
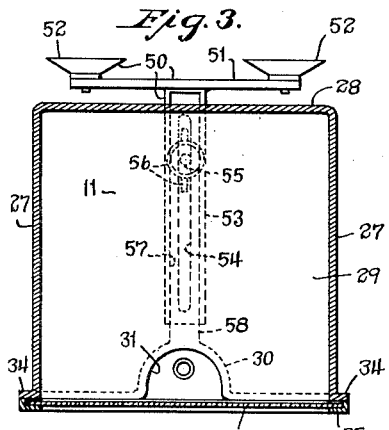
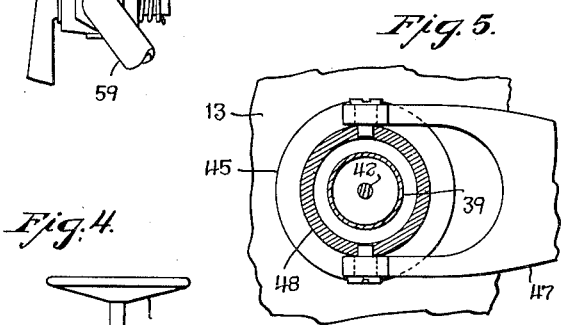
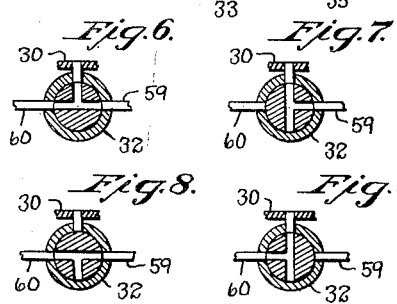
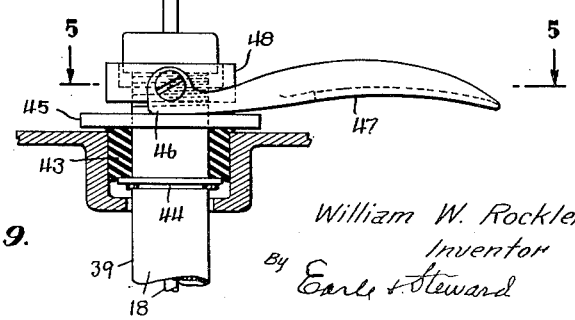
William W. Rocklen
Inventor
By Earle & Steward
Attorneys Patented Dec. 15, 1953

2,662,398

UNITED STATES PATENT OFFICE 2,662,398

FUEL-SYSTEM TESTING DEVICE

William W. Rocklen, West Haven, Conn.

Application January 9, 1951, Serial No. 205,105

6 Claims. (Cl. 73—113)

The present invention relates in general to a portable emergency fuel-system and fuel-system testing-device for use in conjunction with the fuel-system of the internal combustion engine of a vehicle.

An object of the invention is to provide a superior portable emergency fuel-system and fuel-system testing-device which is a self-contained unit of durable, dependable and economical construction embodying an integrated fuel-reserve chamber and burette-chamber.

A further object of the invention is to provide a superior portable emergency fuel-system and fuel-system testing-device of the type hereinabove described having improved supporting-means thereon for detachably securing the unit on the window, door frame, or other part of a vehicle.

A still further object of the invention is to provide a superior portable emergency fuel-system and fuel-system testing-device of the type hereinabove described for testing the fuel-system of a vehicle for its efficiency, leaks, pressure ratings, plugged condition of the lines, and the like.

A still further object of the invention is to provide a superior portable emergency fuel-system and fuel-system testing-device of the type hereinabove described, which may be used in an emergency to supply the fuel-system of a vehicle with gasoline; and to make gasoline-mileage tests on the engine of a vehicle.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a front elevation of the improved emergency fuel-system and fuel-system testing-device of this invention;

Fig. 2 is an enlarged side elevation in section of the fuel-system testing-device on line 2—2 of Fig. 1;

Fig. 3 is a top plan sectional view of the fuel-system testing-device on line 3—3 of Fig. 1;

Fig. 4 is an enlarged fragmentary side elevation partly in section on line 4—4 of Fig. 2 of the manually-operated air pump mounted in the top of the fuel-reserve chamber;

Fig. 5 is a fragmentary plan view in section of the manually-operated air pump on line 5—5 of Fig. 4;

Fig. 6 is a diagrammatic front view of the three-way valve with the valve-plug set to permit fuel to flow from the fuel pump to the fuel-system testing-device and to the carburetor;

Fig. 7 is similar to Fig. 6 but with the valve-plug set to close off the testing-device from the carburetor;

Fig. 8 is similar to Fig. 6 but with the valve-plug set to by-pass the testing device; and Fig. 9 is similar to Fig. 6 but with the valve-plug set to connect the carburetor to the testing-device.

The portable emergency fuel-system and fuel-system testing-device illustrated in the drawings and hereinafter described is a modification of a portable emergency fuel-system and fuel-system testing-device described and illustrated in my co-pending application, Ser. No. 97,022 filed June 3, 1949, of which the present application is a continuation-in-part.

Referring to the drawings, the emergency fuel-system and fuel-system testing-device is characterized by a self-contained unit which comprises, in the main, an integrated fuel-reserve chamber and burette-chamber formed as a single unit of rigid and durable construction. The term "integrated" as used hereinafter to define the structure of the fuel-system testing-device of this invention shall be understood to connote a rigid self-contained unit independent of frame-means. In particular, the integrated fuel-reserve chamber and burette-chamber are formed of a material such as, for example, a metal or plastic, capable of being molded or otherwise fabricated to form a relatively non-frangible substantially-rigid unit, the fuel-reserve chamber of which is indicated generally by the numeral 10 and the burette-chamber by the numeral 11. As may be seen from Figs. 1, 2 and 3, both the fuel-reserve chamber 10 and the burette-chamber 11 are substantially-rectangular box-like enclosures, the burette-chamber being of considerably less volumetric capacity than the fuel-reserve chamber 10. Referring in particular to the fuel-reserve chamber 10, the latter comprises oppositely-disposed side walls 12—12, a top wall 13, a bottom wall 14 and a back wall 15. Projecting inwardly into the fuel-reserve chamber from the underside of the top wall 13 thereof is a vertically-apertured boss 16 which provides a filling-aperture for delivering fuel into the fuel-reserve chamber. A counterbore 17 is formed in the upper end of the apertured boss to provide a recess for accommodating a manually-operated air pump which is indicated generally at 18 and hereinafter described, and which is adapted to make a fluid-tight seal in the counterbore 17 of the apertured boss 16.

The top wall 13 of the fuel-reserve chamber 10 is provided also with an upstanding boss 19 having an inverted L-shaped passage 20 therein communicating at one end with the interior of the fuel-reserve chamber. The opposite end of the passage 20 intersects the front face of the upstanding boss 19 and is internally threaded to accommodate the nipple 21 of a vacuum-and-pressure gauge indicated generally at 22. Extending vertically into the top of the upstanding boss 19 and intersecting the vertical leg of the inverted L-shaped passage 20 is an internally-threaded aperture in which a manually-operated relief-valve, indicated generally at 23, is threadedly engaged. The relief-valve is normally closed but is adapted to be operated manually to open the fuel-reserve chamber to the atmosphere for providing gravity feed, as hereinafter described.

The fuel-reserve chamber 10 is supported in vertically-spaced relationship to the burette-chamber 11 by a substantially-vertical flange 24 which is integral with and interconnects the front edges of the bottom wall 14 and top wall 25 of the fuel-reserve chamber and burette-chamber respectively, the flange 24 having a rearwardly-offset substantially-vertical niche 26 therein. The latter is substantially semicircular in cross section and intermediate the respective side walls of the fuel-reserve chamber and burette-chamber and serves as a restricted passage interconnecting the said chambers.

As in the construction of the fuel-reserve chamber 10, the top wall 25 of the burette-chamber is formed integrally with its side walls 27—27, back wall 28 and bottom wall 29. Formed at the front edge of the latter substantially intermediate the opposite sides 27—27 of the burette-chamber and directly below the niche or restricted passage 26 is an integral depending substantially vertically-apertured boss 30 having a counterbore 31 which intersects the front edge of the bottom wall 29. An inlet and outlet passage or aperture at the lower end of the depending boss 30 is provided with internal threads for threaded engagement with the stem of a three-way valve indicated generally at 32.

It has been discovered that it is essential to the satisfactory performance of the fuel-testing device that the fuel-reserve chamber and burette-chamber be designed to prevent air pockets from forming therein during normal use of the device, that is to say, when the device is attached to a part of a vehicle. This is particularly true when making a mileage test, inasmuch as the formation of air pockets in the burette-chamber would produce an incorrect measure of the fuel therein.

To this end, the bottom wall 14 of the fuel-reserve chamber is concave in cross section as shown especially well in Fig. 1 and, as shown in Fig. 2, also slopes upwardly and rearwardly from its front edge. Moreover, the bottom wall 29 of the burette-chamber is similarly formed, while the top wall 25 of the burette-chamber is convex in cross section and slopes downwardly and rearwardly from its front edge. Thus, even though the chambers of the fuel-system testing-device are inadvertently tipped at an angle to the vertical, the nonplanar and inclined construction of the bottom walls and top wall of the fuel-reserve chamber and burette-chamber, respectively, precludes the formation of air pockets therein.

In the embodiment of the invention shown, the front wall of the integrated fuel-reserve chamber and burette-chamber comprise a single panel 33 which is adapted to provide visual inspection of the interiors of the fuel-reserve chamber and burette-chamber. To this end, the front panel 33 of the device comprises a sheet of substantially-transparent material such as, for example, glass or plastic, corresponding in width and length to the over-all dimensions of the front edges of the integrated chambers, the front edges of which are provided with laterally-extending flanges 34 (Fig. 3). The transparent front panel 33 is held tightly against these flanges by means of a gasket-and-frame-member 35 secured to the flanges by screws or equivalent fastening-means. As shown in Fig. 1, the gasket-and-frame member has openings therein corresponding substantially to the openings in the front end of the integrated fuel-reserve chamber and burette-chamber respectively, the openings of the gasket-and-frame-member being separated, in part, by an intermediate cross-member 36 having a substantially-vertical cutout therein opposite the restricted passage 26 of the chambers. Moreover, the bottom edge of the lower opening in the gasket-and-frame-member is provided with a U-shaped recess substantially opposite the counterbore 31 of the apertured boss 30.

Extending transversely of the transparent panel 33 of the device opposite the restricted passage 26 and the counterbore 31 of the chambers are index lines 37 and 38, respectively, which serve to indicate a predetermined volume of fluid in the burette-chamber of the device. In the present embodiment of the invention, the index marks 37 and 38 measure substantially one-tenth of a gallon of fuel, as and for the purpose hereinafter described. The provision of a transparent panel secured in the manner hereinabove described to the front edges of the fuel-reserve chamber and burette-chamber to provide visual inspection of the interiors of these chambers, is a particularly satisfactory construction for a fuel-testing device formed of metal or other opaque material. However, it is within the purview of the invention to form the fuel-testing device of a suitable plastic, in which case the front panel of the device may be either a separate transparent panel secured in any suitable manner to the front edges of the device; or may be an integrally-molded wall or panel of the device.

Referring again to the manually-operated air pump 18, although any suitable type of air pump may be used, the air pump 18 is a preferred construction and comprises a cylinder 39 closed at its bottom end by an end wall having a one-way valve 40. A piston 41 is reciprocably mounted in the cylinder 39 and is adapted to be operated manually by a handgrip or handle 42 at the upper end of the piston-rod. A resilient sealing-ring 43 is supported on the upper end of the cylinder 39 by means of a retaining-ring 44, the sealing-ring being adapted to be expanded radially to form a fluid-tight seal with the counterbore 17 of the apertured boss 16. To this end, a sealing-ring compressing-annulus 45 is slidably supported on the upper end of the cylinder in engagement with the upper end of the sealing-ring 43, and is adapted to be moved to and from engagement with the upper end of the sealing-ring by the cam-shoulders 46 of the bifurcated arms of a manually-operated yoke 47, the bifurcated arms of which are pivotally secured to opposite sides of a collar 48 threadedly secured on the upper end of the cylinder and capable of being adjusted to take up wear. Thus, when the yoke 47 is swung into its substantially-upright position, the cam-shoulders 46 of its bifurcated arms are withdrawn from engagement with the compressing-annulus 45, thereby relieving pressure on the sealing-ring 43 and breaking the seal between the latter and the counterbore 17 of the boss 16. The pump 18 may thereupon be readily removed therefrom. Upon inserting the latter in the counterbore 17 of the boss 16 and swinging the yoke 47 downwardly into its substantially-horizontal position, as indicated in Figs. 1 and 4, the cam-shoulders 46 of the bifurcated arms of the yoke force the compressing-annulus downwardly longitudinally of the cylinder, thereby expanding the sealing-ring 43 radially into fluid-tight sealing engagement with the counterbore of the boss 16.

The emergency fuel-system and fuel-system testing-device is adapted to be detachably mounted on a vehicle for supplying the fuel-system of the latter with fuel from the reserve-chamber 10 for making mileage-test runs by utilizing the measured quantity of fuel in the burette-chamber, and for performing other tests on the fuel-system of the vehicle, as hereinafter described. In order to detachably mount the emergency fuel-system and fuel-system testing-device on a vehicle, the self-contained unit is provided with supporting-means comprising an upstanding substantially hook-shaped supporting-member 49 secured to the back wall 15 of the fuel-reserve chamber 10 by fastening-means such as, for example, the screws shown in Fig. 2. Used in conjunction with the hook-shaped member of the fuel-reserve chamber is an adjustable suction-cup-and-arm assembly 50 which is mounted on the bottom of the burette-chamber for longitudinal sliding movement thereon in a direction substantially at right angles to the plane of the upstanding hook-member 49.

Referring especially to Figs. 2 and 3, the suction-cup-and-arm assembly 50 comprises a T-shaped member, the head 51 of which is provided at its opposite ends with suction-cups 52—52 which project rearwardly therefrom. The arm 53 of the T-shaped member is slotted longitudinally as at 54 to accommodate a threaded stud 55 which projects below the underside of the bottom of the burette-chamber, the lower extremity of the stud being provided with a wing-nut 56 for securing the arm 53 in any desired adjusted position. In order that the longitudinal movement of the arm 53 of the T-shaped member may be guided, the arm is preferably provided on its upper face with a longitudinal groove 57 adapted to slidingly engage over a longitudinal guide-rib 58 projecting from the underside of the bottom of the burette-chamber, the guide-rib being located substantially intermediate the opposite sides of the burette-chamber and parallel thereto.

The fuel-reserve and fuel-system testing-device is adapted to be detachably supported in a vehicle by the hook-member 49 and the adjustable suction-cup-and-arm assembly 50 by engaging the hook-member over the upper edge of the window, window-frame opening, or other part of the vehicle, with the integrated fuel-reserve chamber and burette-chamber projecting into the interior of the vehicle. The suction-cup-and-arm assembly is then adjusted by sliding the latter longitudinally so as to bring the suction-cups against the inside wall of the door or the inner surface of the window of the vehicle, the adjustment of the suction-cup-and-arm assembly being made so that the unit will be supported substantially vertically, that is to say, so that the vertical plane of the transparent front panel of the device will be substantially perpendicular to the level of the fuel therein. Having adjusted the suction-cup-and-arm assembly in this manner, the wing-nut 56 is tightened to hold the latter in its adjusted position.

As stated at the outset, the emergency fuel-system and fuel-system testing-device described herein is adapted to be used in the same manner as that of the emergency fuel-system and fuel-system testing-device disclosed in my co-pending application identified above, for performing a plurality of tests on the fuel-system of the internal combustion engine of a vehicle.

In all of these tests, the integrated fuel-reserve chamber and the burette-chamber serve to store a relatively-large quantity of fuel. Although the size of the fuel-reserve chamber and burette-chamber may be varied to provide different fuel capacities, a device having a fuel-reserve chamber of substantially one-quarter gallon capacity and a burette-chamber of substantially one-tenth gallon capacity has been found practicable.

Briefly and by way of example, let it be assumed that the emergency fuel-system and fuel-system testing-device is to be used to test the fuel-system of a vehicle; then, the device is connected between the fuel pump and carburetor by means of flexible tubes 59 and 60, in the manner shown in Fig. 1, but with the valve-handle 61 of the multi-flow control-valve turned clockwise into a substantially-horizontal position. With the valve set as seen in Fig. 6 and the engine running, the fuel pump will pump fuel under pressure into the fuel-reserve chamber and also into the carburetor. Under these conditions, it will be apparent that with the relief-valve open, by timing the rise of fuel in the burette-chamber between its upper and lower index marks, the flow-rate of the pump may be readily checked; and that after closing the relief-valve, the fuel in the fuel-reserve chamber will ultimately be under pressure corresponding to the pressure developed by the fuel pump, and that this pressure will be indicated by the meter. The reading of the meter may be checked against the rated pressure of the fuel pump to determine whether or not the fuel pump is developing its rated pressure. Should it happen that the fuel line from the pump to the gasoline tank has a leak, then air will be drawn into the line and will appear as bubbles in the fuel discernible through the transparent panel at the front of the testing-device.

The location of an air leak in the fuel-system may then be detected by disconnecting the main fuel-supply pipe from the fuel-tank and connecting to this end of the main supply-pipe the flexible tube 60 which leads from the three-way valve to the carburetor, thereby forming a closed system including the fuel pump and the fuel-system testing-device. Thereupon, by operating the air pump manually, pressure may be developed in the closed system to force fuel out of the leak therein, the escape of fuel from the leak thereby indicating the location thereof.

While these and many other tests may be performed on the fuel-system of a vehicle as described in the above-identified co-pending application, one of the most important applications of the portable emergency fuel-system and fuel-system testing-device is its use as an emergency fuel-system for bringing cars in under their own power, which have been stalled on the highway due to fuel-system trouble. To this end, the three-way valve is set as indicated in Fig. 8 so as to shut off the two laterally-extending passages thereof, and fuel is poured into the fuel-reserve chamber through the filling-aperture in the top thereof, after which the hand-pump is placed in the filling-aperture to tightly seal the latter. The emergency fuel-system testing-device is then hung on the door-frame or window of the stalled car in the manner hereinabove described, whereupon one side of the valve is connected by the flexible hose 60 to the inlet side of the carburetor and the opposite side of the valve is connected by the flexible hose 59 to the pressure side of the fuel pump. The valve-handle 61 is then turned horizontally to the left to set the valve as indicated in Fig. 6, to permit the fuel in the fuel-reserve chamber to flow to the carburetor. At the same time, any fuel which may be in the fuel-supply line will be pumped to the carburetor by the fuel pump. If the latter is not in working condition and it is desirable to feed the fuel from the reserve-chamber under pressure, then the hand-pump is operated to develop the necessary pressure within the fuel-reserve chamber. It is also possible that the fuel may be fed to the carburetor by gravity, in which case the relief-valve 23 in the top of the fuel-reserve chamber is opened to allow atmospheric pressure to feed the fuel to the carburetor.

With regard to the burette-chamber of the device, this is utilized in making a mileage test on the engine of an automobile and is carried out as follows. The testing-device is mounted on the door-frame, window, or other part of a vehicle and the transverse passages of the valve are connected between the carburetor and the pressure side of the fuel pump, in the manner shown in Fig. 1. Assuming that fuel has been pumped into the fuel-reserve chamber, then the valve-handle is turned to the position shown in Fig. 9 to shut off the supply of fuel being pumped into the chamber by the fuel pump and to permit fuel to flow from the fuel-reserve chamber to the carburetor, the flow of fuel being augmented by applying pressure thereto by means of the manually-operated pump. The level of the fuel in the reservoir is carefully watched as the vehicle proceeds under its own power until the level of the fuel in the testing-device is down to the upper index mark 37 opposite the restricted passage 26, whereupon the handle of the valve is swung upwardly to its uppermost position as seen in Fig. 8, to temporarily by-pass the integrated fuel-reserve chamber and burette-chamber and allow the fuel pump to feed gasoline directly to the carburetor. There is now a predetermined quantity of fuel in the burette-chamber, the quantity of fuel being, in this instance, exactly one-tenth of a gallon between the upper and lower index marks of the burette-chamber. The operator now notes the mileage on the odometer and immediately turns the handle of the valve to its horizontal position, as shown in Fig. 9, to shut off the supply of fuel from the fuel pump and permit only the limited quantity of fuel in the burette-chamber to flow to the carburetor. When the level of the fuel in the burette-chamber has reached the lower index mark 38 on the front panel of the burette-chamber, substantially one-tenth of a gallon of gasoline has been consumed, and thereupon the valve is turned to the position shown in Fig. 8 to again by-pass the burette-chamber and permit fuel to flow from the pressure side of the fuel pump directly to the carburetor. At the same time, he notes the odometer reading to determine the distance traveled during the consumption of one-tenth of a gallon of fuel. From these figures, the operator may readily determine the miles traversed per gallon by the vehicle.

In addition to the above-described tests for checking the fuel-system of a vehicle for leakage, the rated pressure and rated fuel-flow of the fuel pump, gas consumption per mile, and its use as an auxiliary fuel supply for bringing a stalled vehicle into a gas station, the emergency fuel-system and fuel-system testing-device may be used to check the gas line from the fuel pump to the tank for a plugged condition, to check the vacuum of the fuel pump, to set the fuel level of the carburetor, and to check the pressure rating of the needle and seat of the carburetor, these and other uses of the device being more fully described in my above-identified co-pending application.

From the foregoing description, it will be clear that the improved emergency fuel-system and fuel-system testing-device is adapted to carry out many tests on the fuel-system of a vehicle, as well as to act as a fuel-supply in an emergency and as means for supplying a predetermined measured quantity of fuel for making mileage tests, the improved device being characterized by a self-contained unit embodying an integrated fuel-reserve chamber and burette-chamber of durable, shock-resistant material, and provided with visual inspection-means in a common wall therefor for viewing the interiors of the fuel-reserve chamber and burette-chamber. The self-contained unit is also characterized by supporting-means embodying an adjustable suction-cup-and-arm assembly to permit the unit to be supported in a substantially vertical position against the sloping side walls of the door-frame or glass window of a vehicle.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a combined portable emergency fuel-supply unit and fuel-system testing device for an engine, a relatively infrangible fuel container comprising an integral self-contained unit having a top wall with a filling aperture therein, a bottom wall having an inlet and outlet passage located at the lowest point thereof and side walls having a visual-inspection panel for viewing substantially the entire interior of said container, the side walls opposite and adjacent said visual-inspection panel being necked-in intermediate said top and bottom walls to form a burette-chamber in the lower portion of said container and a fuel-reserve chamber disposed above said burette-chamber, said chambers being interconnected by a restricted passage adjacent said visual-inspection panel, said passage being formed by the necked-in portion of said side walls, a second restricted passage located in the bottom of said burette-chamber adjacent said visual-inspection panel being in communication with said inlet and outlet passage, and a hand-operated pump removably mounted in said filling aperture of said fuel container, said pump being constructed and arranged to make an air-tight seal in said filling aperture.

2. The combination defined in claim 1 wherein said visual-inspection panel is a substantially flat vertically disposed wall extending from top to bottom of said fuel container.

3. In a combined portable emergency fuel-supply unit and fuel-system testing device for an engine, a relatively infrangible fuel container comprising a body-portion having an open side covered by a visual-inspection panel secured thereto, said body-portion being divided by a partition into a burette-chamber in the lower portion of said container and a fuel-reserve chamber disposed above said burette-chamber, said partition having an elongated constricted passage interconnecting said fuel chambers adjacent said inspection panel, a second restricted passage located in the bottom of said burette-chamber adjacent said inspection panel and an inlet and outlet passage connecting said restricted passage with the fuel system of said engine, a filling aperture provided in the top of said fuel-reserve chamber and a hand-operated pump removably mounted in said filling aperture, said pump being constructed and arranged to make an airtight seal in said filling aperture.

4. The combination defined in claim 3 which further includes a pressure-and-vacuum gauge connected with said fuel-reserve chamber and a relief valve in the top of said fuel container for venting same.

5. In a combined portable emergency fuel-supply unit and fuel-system testing device for an engine, a fuel container having a top wall with a filling aperture therein, a bottom wall having an inlet and outlet passage located at the lowest point thereof and side walls having visual-inspection means for viewing substantially the entire interior of said container, said side walls being necked-in intermediate said top and bottom walls to form a burette-chamber in the lower portion of said container and a fuel-reserve chamber disposed above said burette-chamber, said chambers being interconnected by a restricted passage formed by the necked-in portion of said side walls, a second restricted passage located in the bottom of said burette-chamber being in communication with said inlet and outlet passage, and means connected to said fuel container for applying pressure therein.

6. The combination defined in claim 5 wherein said means for applying pressure to said container comprises a hand-operated pump mounted in a wall of said fuel-reserve chamber.

WILLIAM W. ROCKLEN.

References Cited in the file of this patent

UNITED STATES PATENTS

| Number | Name | Date |
|---|---|---|
| 1,718,553 | Gauthier | June 25, 1929 |
| 1,853,970 | Gauthier | Apr. 12, 1932 |
| 2,073,243 | Liddell et al. | Mar. 9, 1937 |
| 2,215,680 | Wiley | Sept. 24, 1940 |